(12) United States Patent
Eberle

(10) Patent No.: US 6,502,892 B2
(45) Date of Patent: Jan. 7, 2003

(54) CONVERTIBLE MOTOR VEHICLE ROOF

(75) Inventor: Andreas Eberle, München (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/782,511

(22) Filed: Feb. 14, 2001

(65) Prior Publication Data

US 2001/0020793 A1 Sep. 13, 2001

(30) Foreign Application Priority Data

Feb. 14, 2000 (DE) .......................... 100 06 290

(51) Int. Cl.[7] .................................. B60J 7/14
(52) U.S. Cl. ............. 296/108; 296/107.17; 296/107.18
(58) Field of Search ........................ 296/107.01, 108, 296/116, 107.16, 107.17, 107.18, 107.2

(56) References Cited

U.S. PATENT DOCUMENTS

| | | | |
|---|---|---|---|
| 4,165,122 A | * 8/1979 | Bertone | 296/107.18 |
| 5,542,735 A | 8/1996 | Fürst et al. | |
| 5,967,591 A | * 10/1999 | Muehlhausen | 296/107.16 |
| 6,322,130 B1 | * 11/2001 | Wanden et al. | 296/107.01 X |

FOREIGN PATENT DOCUMENTS

DE    43 26 255    9/1994

* cited by examiner

Primary Examiner—Dennis H. Pedder
Assistant Examiner—Jason Morrow
(74) Attorney, Agent, or Firm—Nixon Peabody LLP; David S. Safran

(57) ABSTRACT

A convertible motor vehicle roof with a roof column (4), especially a D-column, which can be moved into a stowed position by a bearing mechanism when the motor vehicle roof is being opened, the bearing mechanism (25) moving the roof column (4) forward on its bottom end with respect to the motor vehicle body and depositing it in its stowed position in a pivoting motion directed rearward around the bottom end of the column. The bearing mechanism (25) can have a linkage arrangement with a first four-bar mechanism (26) which essentially executes forward motion, and a second four-bar mechanism (27) which is combined with it and which executes the pivoting motion. The roof element (2) can be coupled with a pivoting capacity to the top end of the roof column (4).

20 Claims, 14 Drawing Sheets

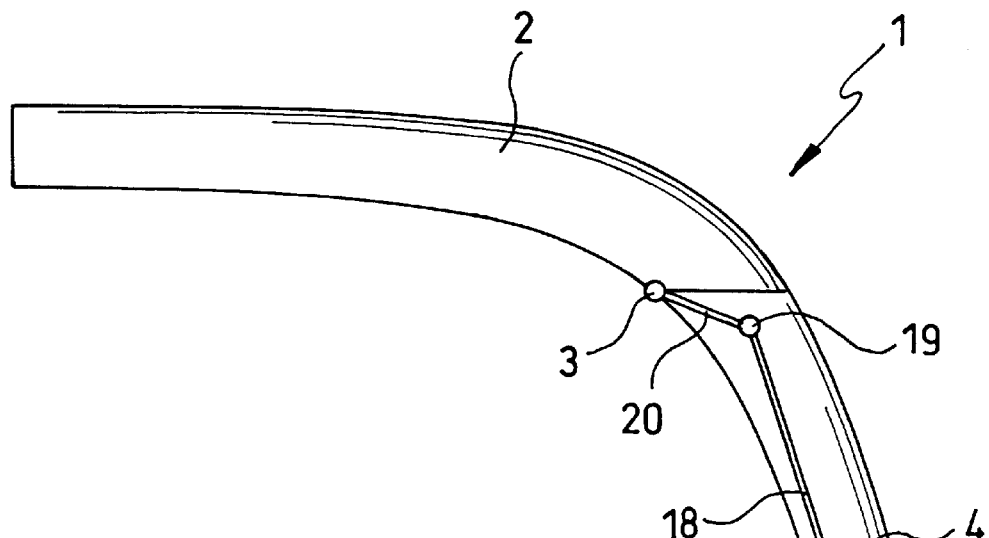
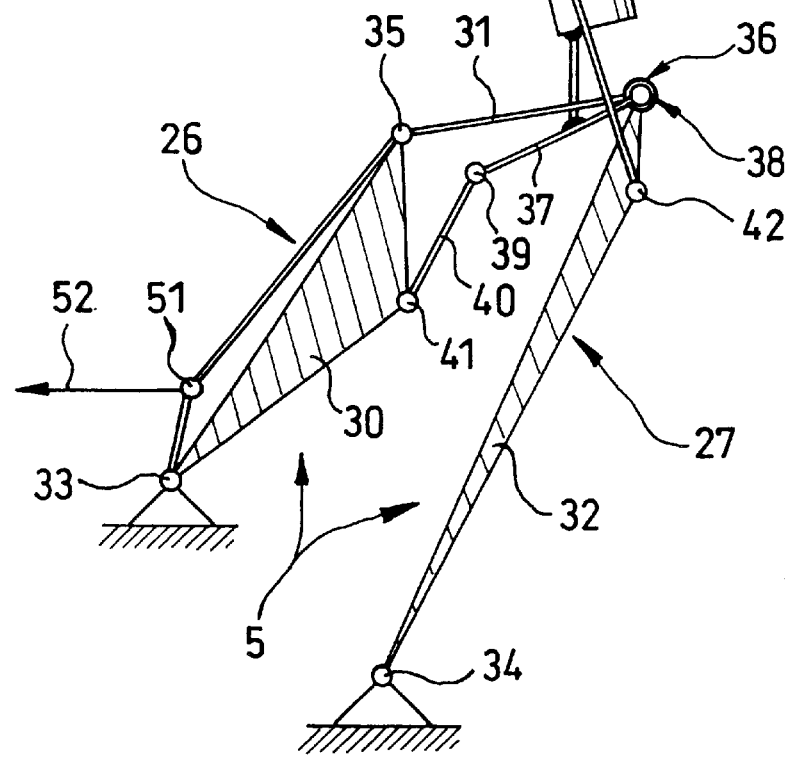
FIG. 13

CONVERTIBLE MOTOR VEHICLE ROOF

BACKGROUND OF THE INVENTION

1. Field of the Invention

The invention relates to a convertible motor vehicle roof with a roof column which can be transferred into a stowed position via a bearing mechanism when the motor vehicle roof is being opened.

2. Description of Related Art

German Patent DE 43 26 255 C1 and corresponding U.S. Pat. No. 5,542,735 disclose a motor vehicle roof which has, laterally on each side, a B column which is supported to be able to pivot and move lengthwise in a body-mounted guide which runs roughly horizontally over the rear axle in the lengthwise direction of the motor vehicle. One roof part is pivotally mounted on the B column and extends from the B column forward in the direction toward the front window. To open and lower the motor vehicle roof, first of all, the rear window is moved to under the roof part and the two rear triangular windows are lowered. Then, the B-column is moved as a unit to the rear together with the roof part and the rear window, lengthwise along the guide without being vertically lowered by means of a drive. In the rear position, the roof part is folded down towards the B column and in the direction of a stowage space. To completely lower the roof into a stowage space behind the seats, the B column is pivoted forward relative to the guide, the angular position of the roof part being adapted to the B column and moved forward by a certain amount.

SUMMARY OF THE INVENTION

The object of the invention is to devise a motor vehicle roof of the initially mentioned type with a bearing mechanism for the roof column which has kinematics which exhibits a simplified dynamic behavior for space-saving deposition of the roof column.

This object is achieved in the above mentioned motor vehicle roof in the invention by the bearing mechanism being designed to move the bottom end of the roof column forward with respect to the motor vehicle body and deposit it in its stowed position in a rearward pivoting motion around the bottom end.

This superimposed motion sequence composed of a forward motion and a pivoting motion makes it possible for the top end of the roof column, when the roof column is being deposited into its stowage position, to follow a curved path which can be established and which, according to the coordination of motion, for example, can lie on a vertical line or on a line which is slightly inclined relative to vertical, or initially executes a motion directed rearward with respect to the lengthwise axis of the motor vehicle, before the downward motion takes place. Initial rearward motion of the top end of the roof column can be feasible when the top end is to be moved away from the roof element to the rear when the roof is deposited after unlocking from the roof element. Basically, the bearing mechanism is suitable for any lateral roof column of a lowerable convertible roof which can be moved forward on its bottom on the body, thus especially for a C column or D column which forms, for example, the rear column in an all-terrain vehicle.

Preferably the bearing mechanism contains a linkage with a first four-bar mechanism which essentially executes forward motion and a second four-bar mechanism which is combined with it and which executes essentially pivoting motion. This linkage contains, for example, seven pivot joints and can be adjusted to the desired dynamic behavior by fixing the articulated positions and the rod lengths.

Motion is transferred from the linkage to the roof column, feasibly, by the middle rod of the second four-bar mechanism forming a roof column rod which is permanently connected to the roof column and which is pivoted when the first four-bar mechanism moves. Furthermore, the linkage can be made such that the front rod of the second four-bar mechanism is coupled to the front rod of the first four-bar mechanism, i.e., the rod which forms especially the ternary member.

The convertible motor vehicle roof can be made such that the roof element on the top section of the roof column is supported in a pivot joint. This roof element is then together with the roof column moved into the stowed position, its being pivoted via the pivot joint connection relative to the roof column. For pivoting, the roof element can have its own pivot drive which, for example, is located in the roof column or in the roof element. Alternatively, the roof element can be moved via an auxiliary rod arrangement with two coupled rods, the drive motion taking place via the coupling of one rod of the second four-bar mechanism.

Another preferred embodiment calls for the bearing mechanism to contain a linkage with a roof column rod which is permanently connected to the roof column and which has two spaced sliding joints which are movably guided on two guide rails which are spaced apart from one another and which are located roughly in the lengthwise direction of the motor vehicle, such that the roof column rod which is moved along the guide rails executes the forward displacement motion and the pivoting motion of the roof column. The guide rails form a comparatively flat unit for producing the forward displacement motion of the roof column. In doing so, the guide rail can initially run essentially linearly for the rear sliding joint and the other guide rail for the front sliding joint initially can run at an angle to the guide rail for the rear sliding joint such that the roof column rod executes an initial pivoting motion around the rear sliding joint Feasibly, the two guide rails extend, as they continue, roughly parallel and are especially curved up essentially in agreement in their end sections. On the other hand, the two guide rails, as they continue, can also diverge, and with each of these embodiments, a certain dynamic behavior of the roof column rod, and thus, of the roof column can be established. Another alternative embodiment calls for the guide rail for the rear sliding joint to have an end curvature with a radius of curvature which roughly corresponds to the mutual distance of the two sliding joints and with a center of curvature which lies on the end stop for the front sliding joint.

In this version of the bearing mechanism, on the top end of the roof column, a roof element can also be pivotally mounted in a pivot joint. Feasibly, the roof element is moved via a 4-rod mechanism with motion derived from the moving roof column. But, it can also have its own drive.

The motor vehicle roof can have, in its forward section, at least one movably supported roof element which can be deposited in its stowed position by means of a deposition mechanism supported on the body, this deposition mechanism being coupled to the bearing mechanism of the roof column. Thus, two independent, movable roof units can be coupled with respect to the deposition motion and to the drive. In this way, the respective deposition motions are coordinated with one another so that collisions of the individual roof parts do not occur during deposition. In addition, one of the drives can be omitted by the coupling since the drive motion is transferred. Coupling can take place preferably mechanically, electrically or hydraulically. A simple mechanical coupling comprises a coupling rod which connects the bearing mechanism and the linkage of the roof column to the four-bar mechanism of the deposition mechanism of the front roof elements.

In the following, embodiments of the motor vehicle roof which is made as claimed in the invention are explained in detail with respect to the drawings.

BRIEF DESCRIPTION OF THE DRAWINGS

FIG. 13 is a schematic depiction of another embodiment of the bearing mechanism for the roof column;

DETAILED DESCRIPTION OF THE INVENTION

Figure 9:
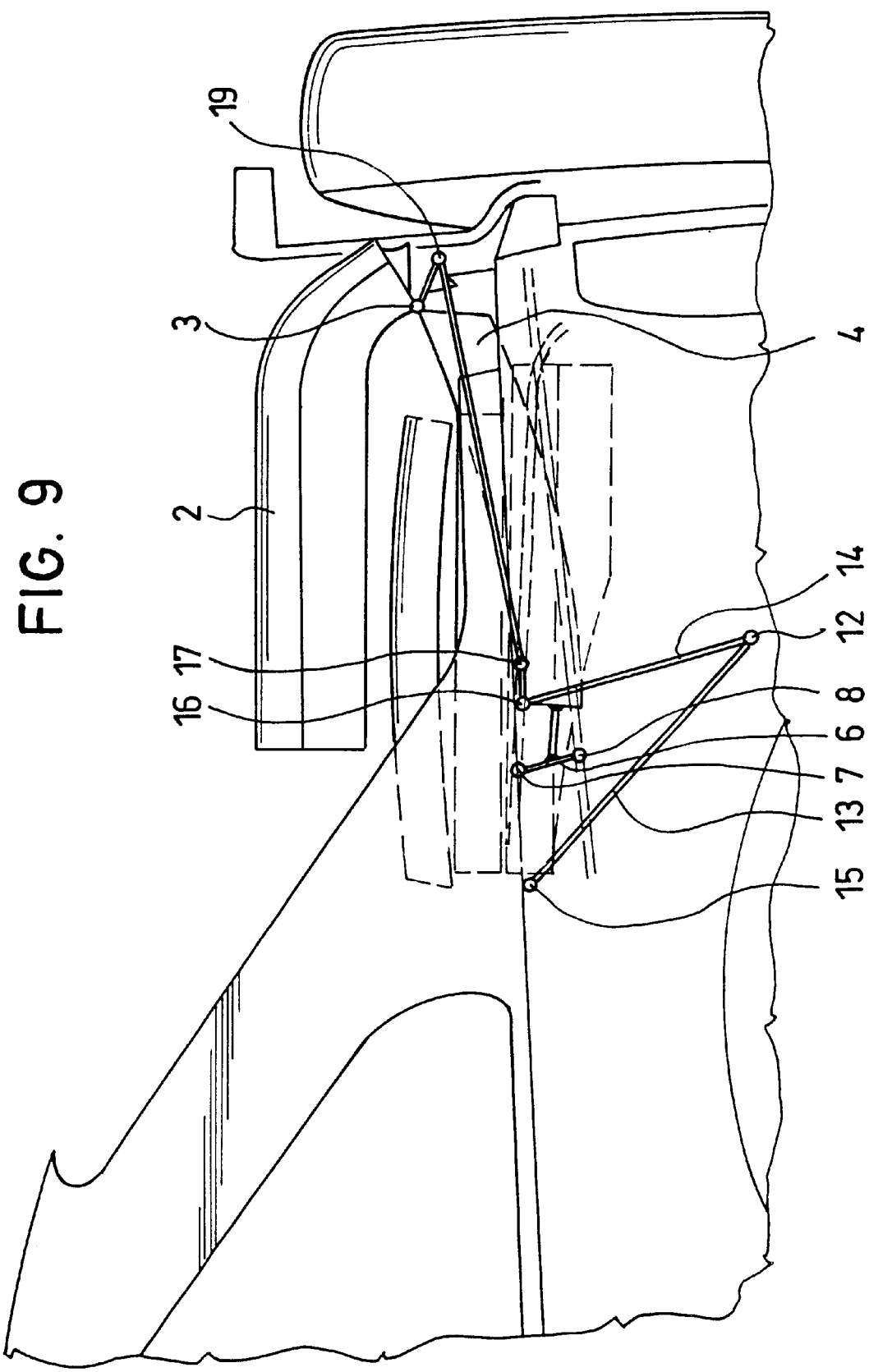

A motor vehicle roof 1, such as that of a station wagon or an all-terrain vehicle, contains at least one movable rear roof element 2 which is supported by means of a pivot joint 3 on a rear roof column 4 (conventionally called the D column) to be able to pivot around the transverse axis of the motor vehicle. The roof column 4 is movably supported by a bearing means 5 on the body and can be moved out of the closed position of the motor vehicle roof 1 shown in FIG. 1 when the motor vehicle roof is being converted into a stowed position (FIG. 9). The motor vehicle roof 1 has two roof columns 4 which are symmetrical to one another with respect to the lengthwise axis of the motor vehicle with their respective corresponding bearing mechanisms, of which only the roof column 4 facing the viewer with its bearing mechanism 5 is described below.

Figure 10:
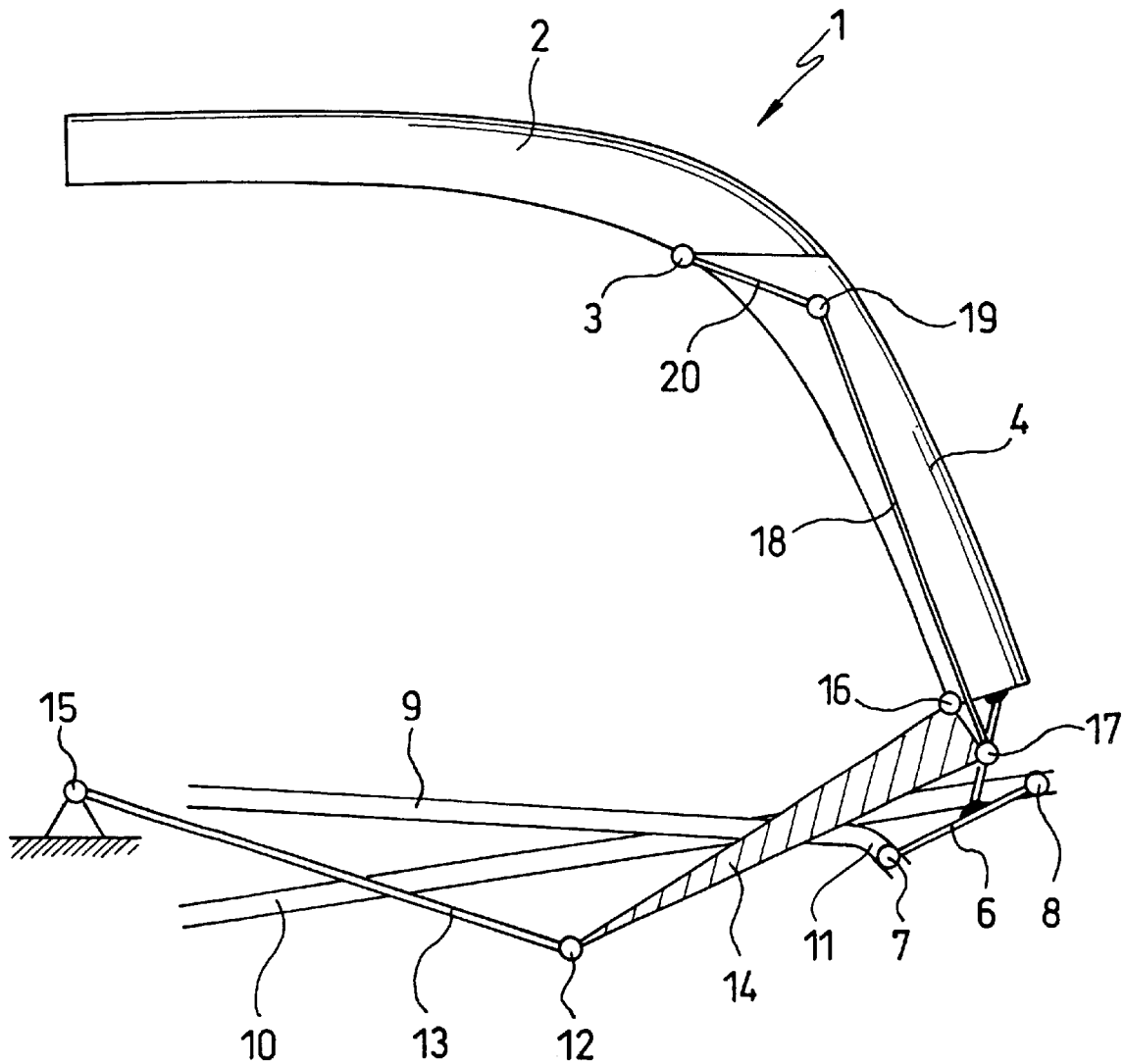
FIG. 10 is a schematic depiction of the roof column with the bearing mechanism.

The bearing mechanism 5 contains a linkage which has a roof column rod 6 which forms a fixed unit with the roof column 4 (see also FIG. 10). On the two ends of the roof column rod 6, there is a respective sliding joint 7, 8, which is movably supported on or in a corresponding one of the guide rails 9, 10. The two guide rails 9, 10 start on the rear of the motor vehicle and extend along the side of motor vehicle body toward the front. The roof column rod 6 is located, in the closed position shown in FIG. 1, in the lengthwise direction of the motor vehicle, such that its rear sliding joint 8 assumes a rear position on the second guide rail 10 and the front sliding joint 7 assumes a front position on the first guide rail 9. The second guide rail 10, which supports the rear sliding joint 8, extends linearly and at a small angle to the horizontal, sloped downward and forward, while the first guide rail 9, which supports the front sliding joint 7, is located initially underneath the second guide rail 10 and has a first ascending section 11 which leads, when viewed laterally, over the second guide rail 10, and then, passes into a linear section which draws increasingly away from the second guide rail 10. The rear sliding joint 8 is connected to the drive (not shown) via which the sliding joint 8, and thus, the roof column rod 6 can be moved along the two guide rails 9, 10. The described linkage has one degree of freedom.

Figure 1:
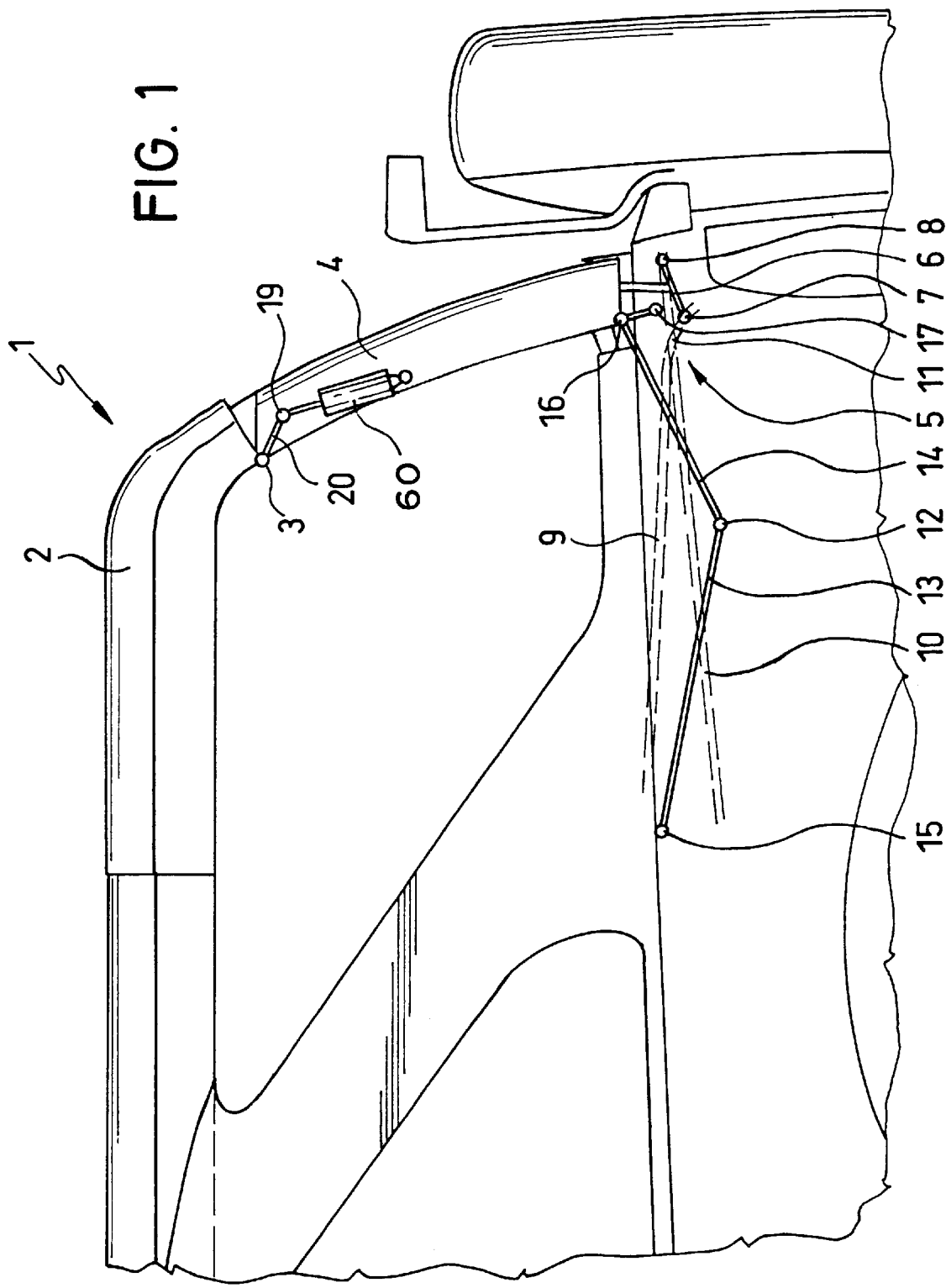
FIG. 1 schematically shows a side view of one embodiment of a convertible motor vehicle roof with a bearing mechanism for depositing a roof column (D column) in the closed position.

To pivot the roof element 2 around the pivot joint 3 relative to the rear roof column 4, there is an auxiliary rod mechanism which has two rods 13, 14 which are connected to one another in a joint 12, the rod 13 being coupled to the body-mounted joint 15 and the rod 14 being coupled to a joint 16 in the bottom area of the roof column 4. The rod 14 is formed as a tertiary element and contains a joint 17 which is spaced away from the joint 16 and in which a rod 18 is coupled (FIGS. 2–9), rod 18 being coupled, in turn, to a rod 20, via a joint 19, which is coupled at the pivot joint 3 on the top end of the roof column 4, and for pivoting purposes, the roof element 2 is connected thereto so as to resist torsional loading. Roof element 2 may alternatively have its own pivoting drive 60 (FIG. 1).

Figure 2:
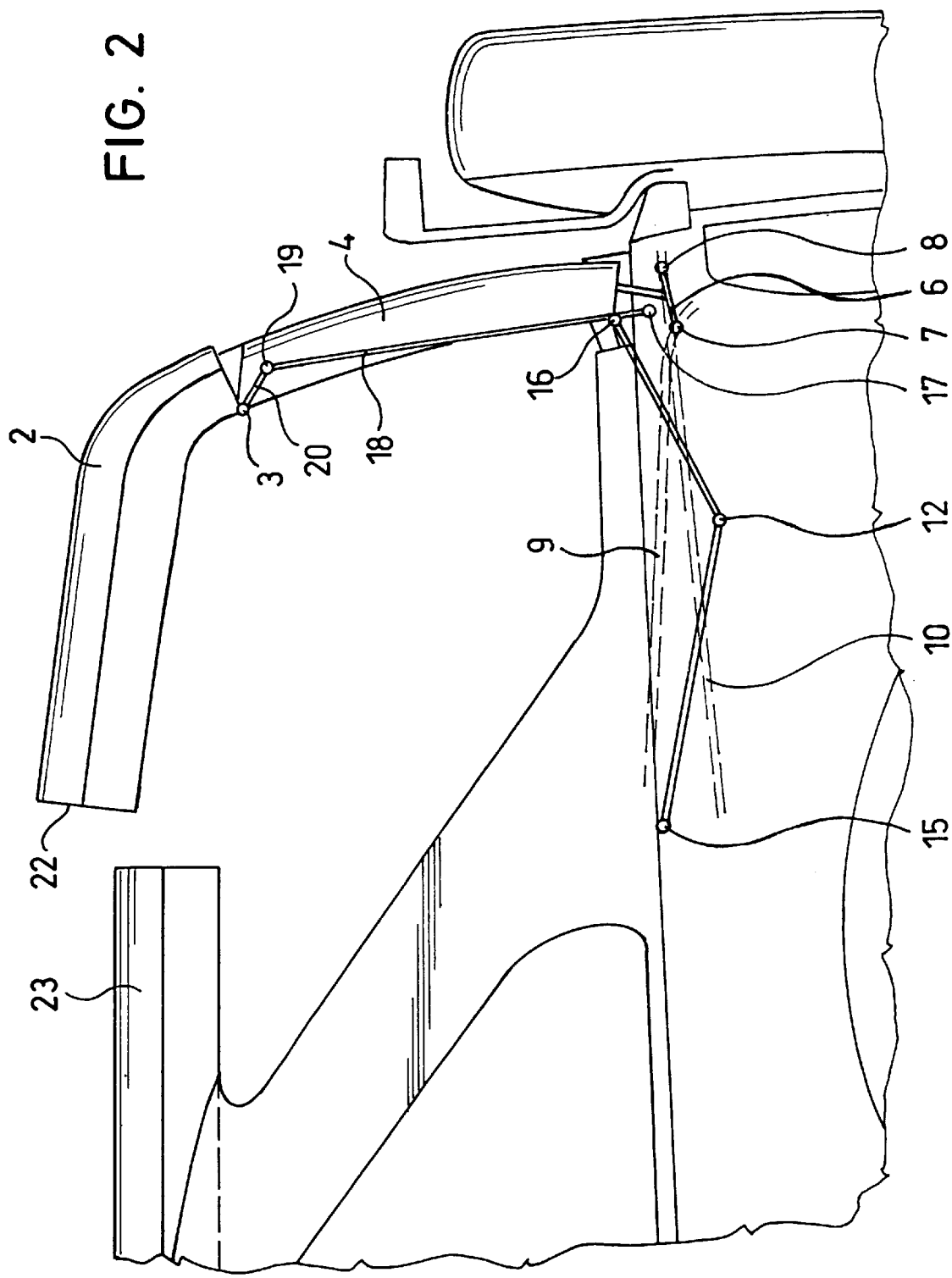
FIGS. 2 to 9 each show a side view of the roof shown in FIG. 1 in a respective position of the motor vehicle roof as the roof column is being deposited into a stowage space.
Figure 3:
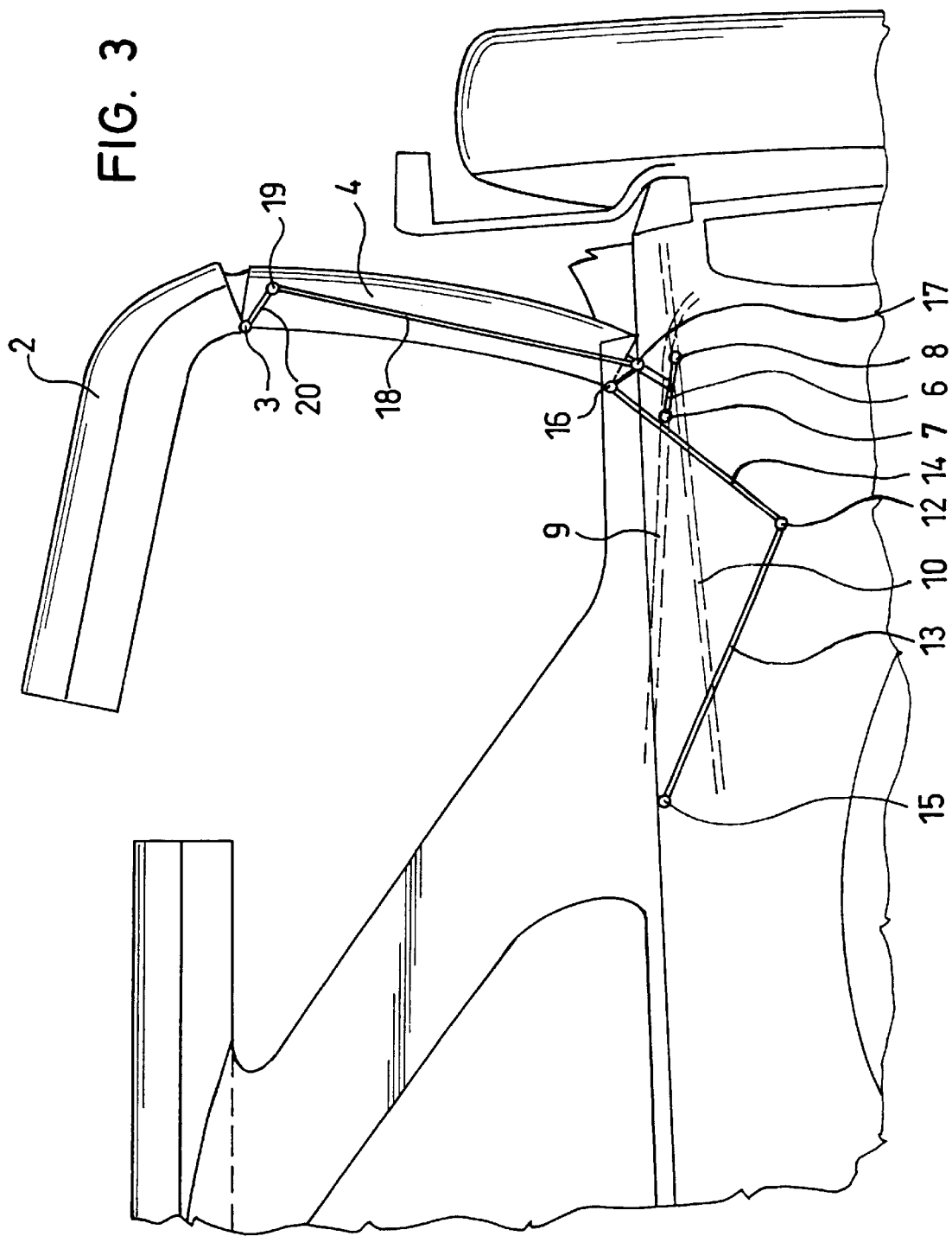
Figure 4:
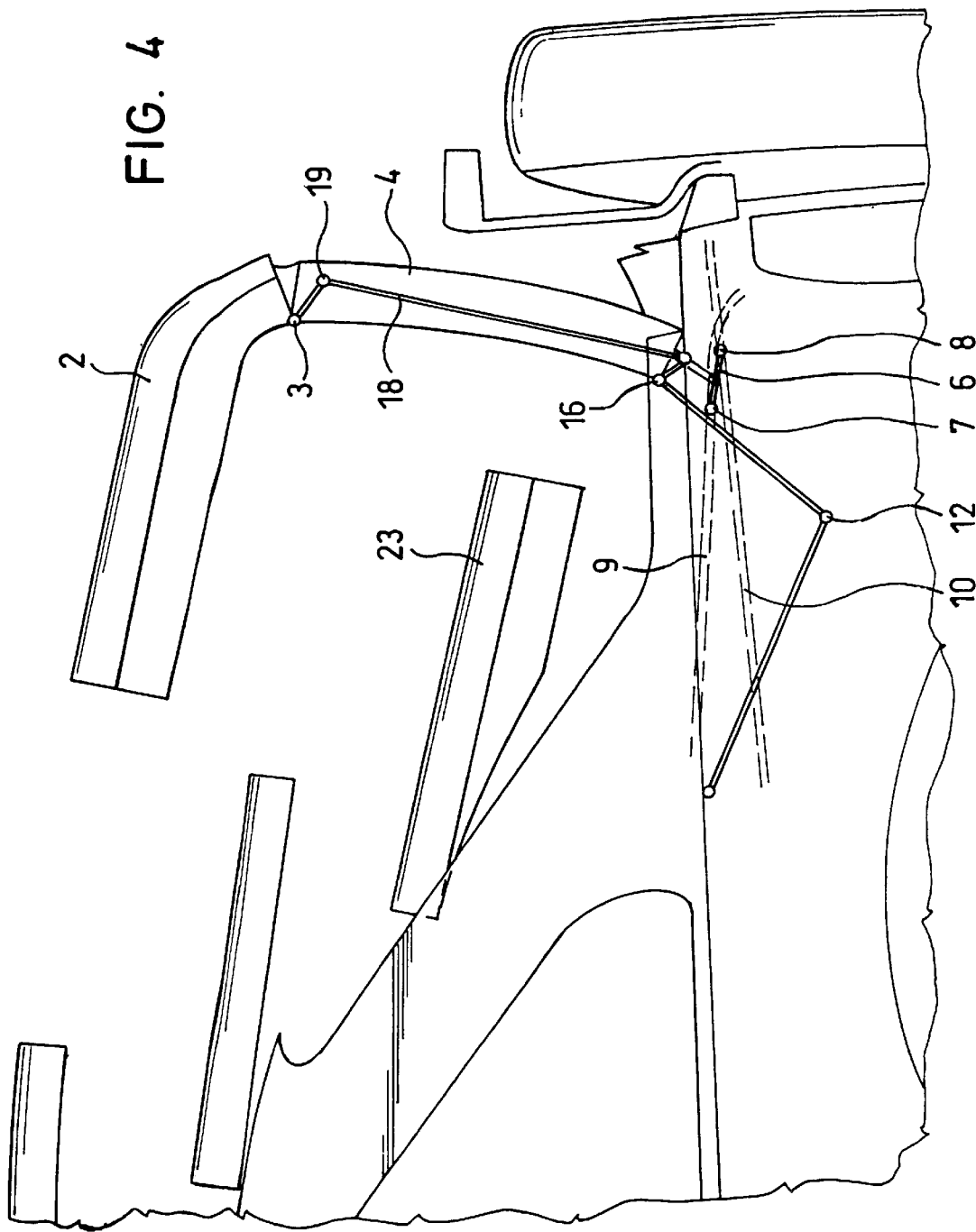
Figure 5:
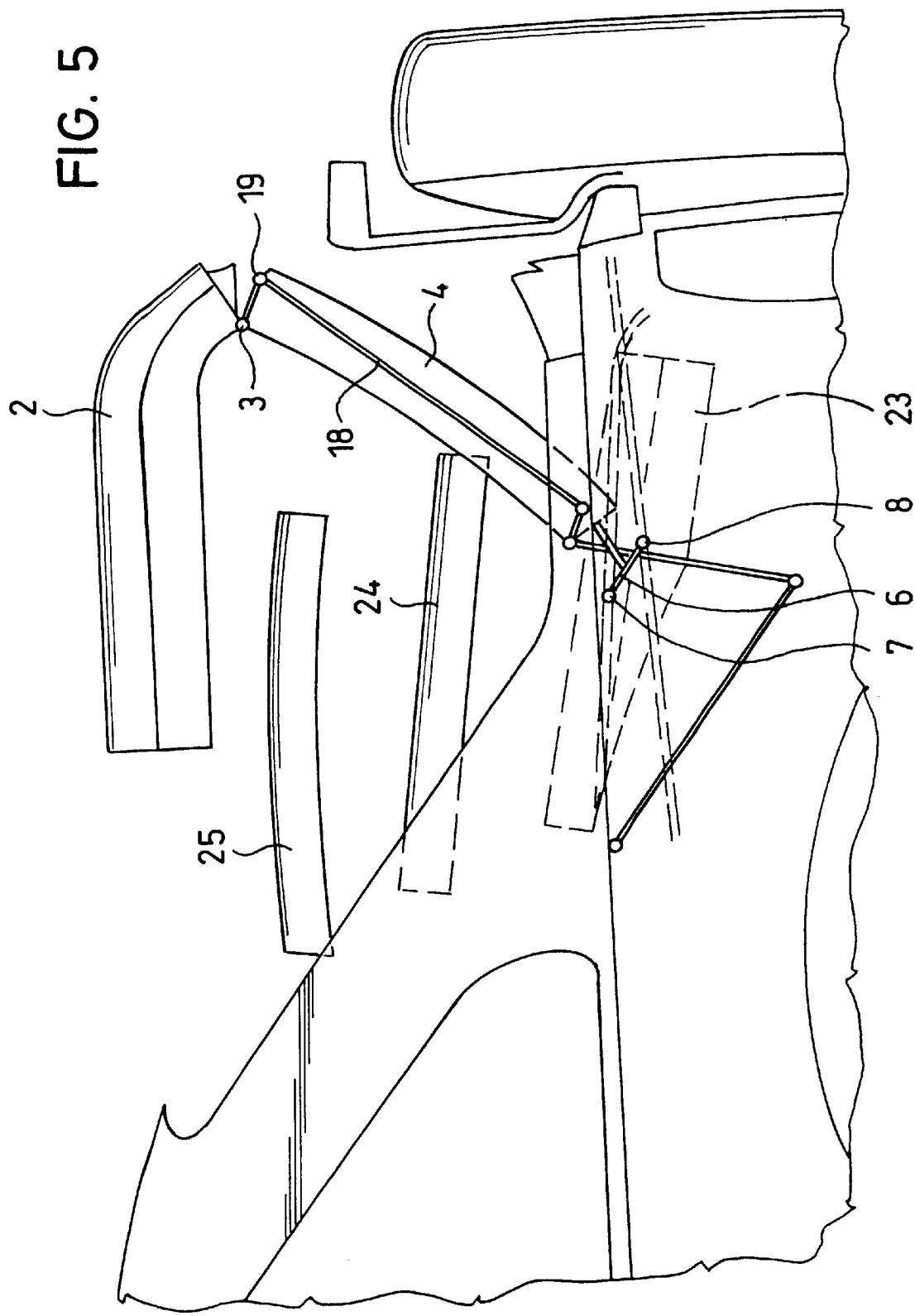
Figure 6:
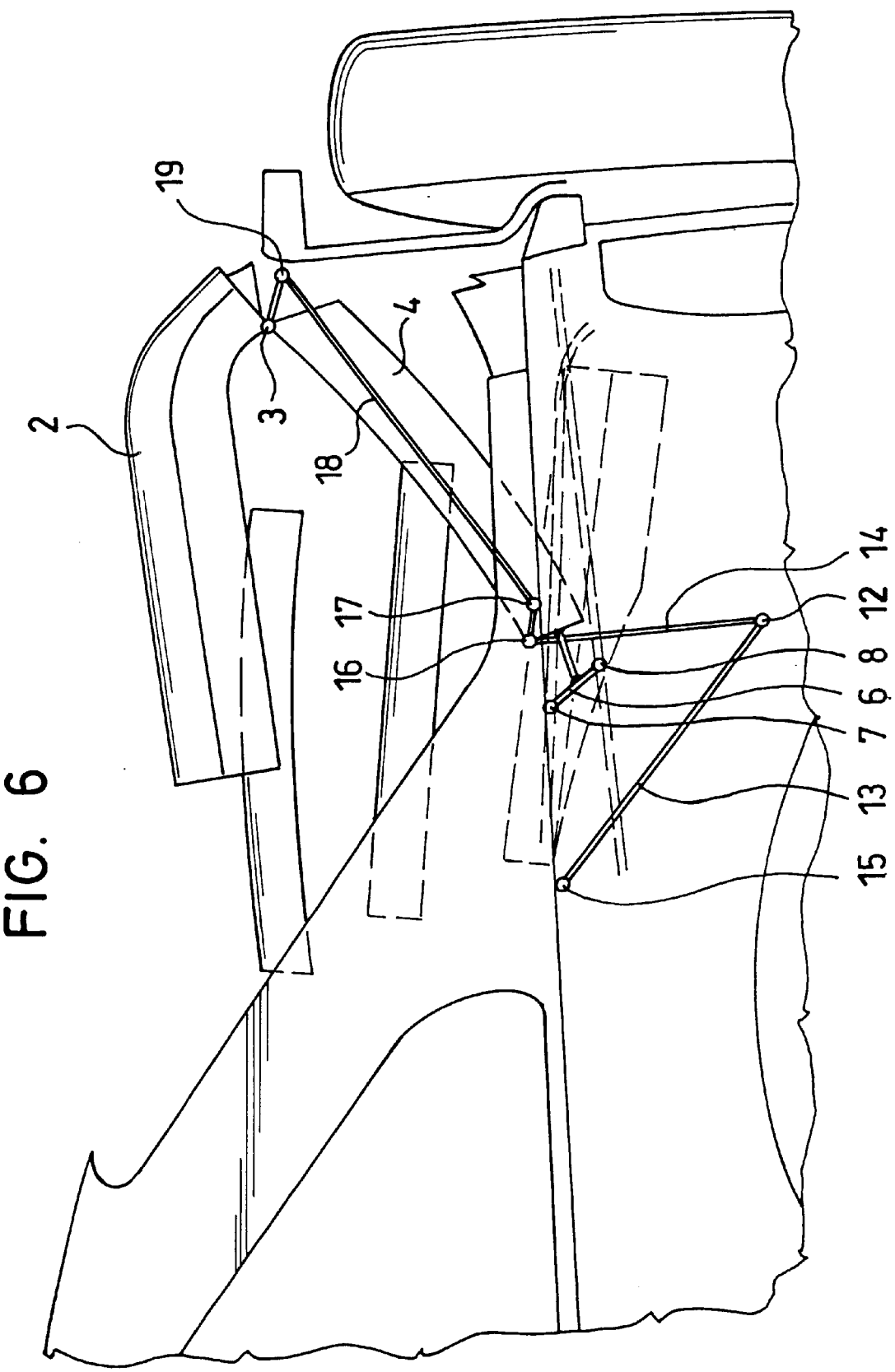
Figure 7:
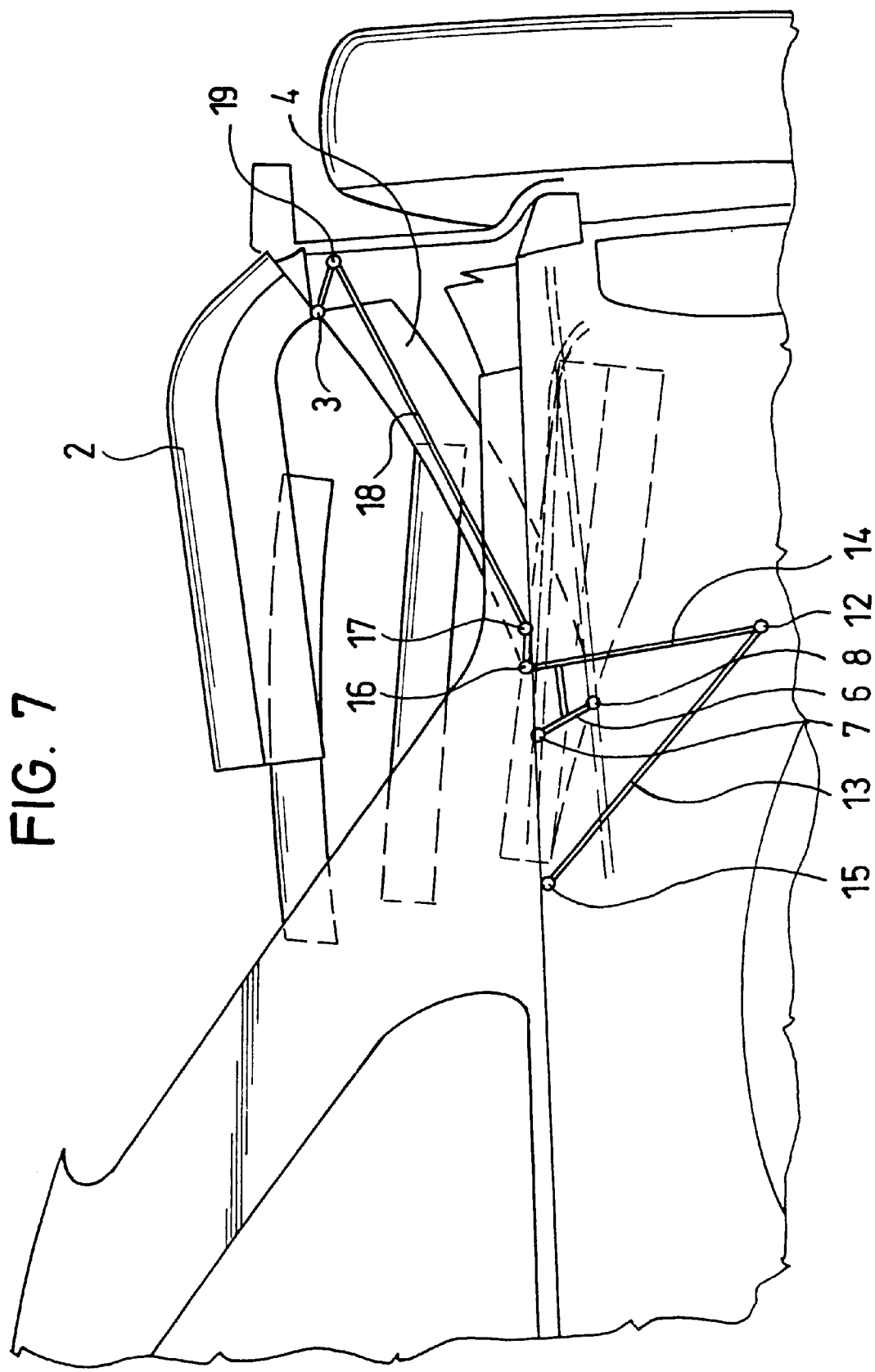
Figure 8:
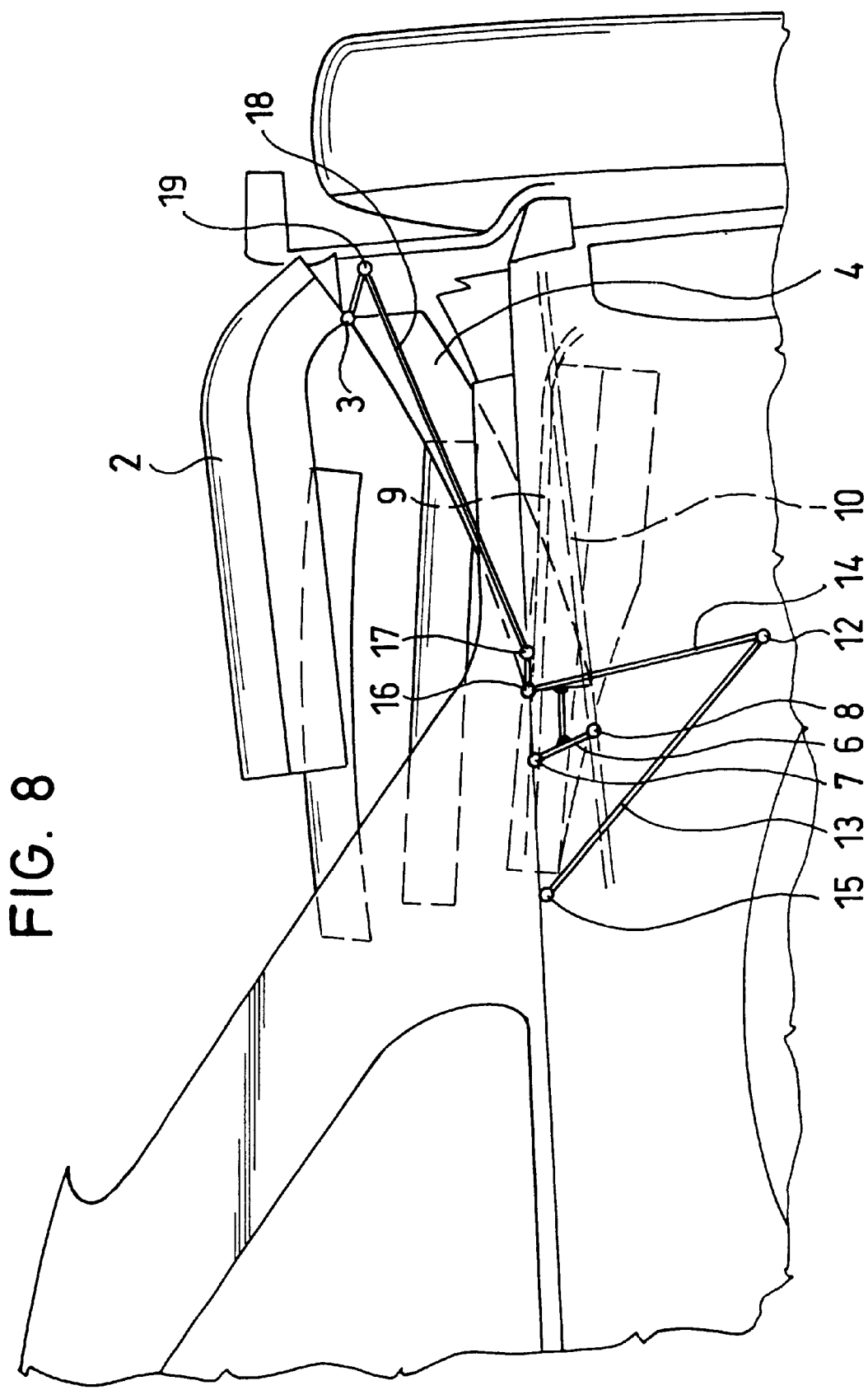

To convert or open the motor vehicle roof 1 from the closed position (FIG. 1), the roof column rod 6 is pushed via the drive, which can alternatively also engage the front sliding joint 7, along the guide rails 9, 10 (FIG. 2). In doing so, the roof column rod 6, on the one hand, is pushed lengthwise, and on the other hand, is raised by the sliding up of the front sliding joint 7 on the ascending section 11 and is pivoted around the rear sliding joint 8 so that especially the top end of the roof column 4 with the roof element 2 moves a short distance up and to the rear. Previously, the roof element 2 has been detached on its front side 22 from locking with an adjoining roof element 23 of the front section of the motor vehicle roof 1. Furthermore, the rear window has been lowered into a rear door and the rear side windows have been lowered into the side walls (not shown).

Furthermore, the roof column rod 6 which moves forward is pivoted more strongly according to the increasingly mutual distance of the two guide rails 9, 10. In addition, the roof element 2 is pivoted by the auxiliary rod means against the roof column 4 so that it retains an essentially horizontal alignment (see FIGS. 3 to 9). Three roof elements 23, 24 and 25 of the front section of the motor vehicle roof 1 are moved into their stowed positions by the front bearing means.

Thus, the roof columns 4 with the roof element 2 are deposited on top of one anther in a space-saving manner in a horizontal arrangement. The top end of the roof column 4 and the pivot joint 3 are moved down by the superposition of the forward displacement motion and the pivoting motion on a path which does not extend beyond the rear edge of the motor vehicle. This curve can run slightly inclined or also almost vertically according to the layout of the rod means.

The extension of the stowed roof column 4 and roof element 2 and also the remaining roof elements of the stowed motor vehicle roof 1 takes place in the opposite sequence of motions.

Figure 11:
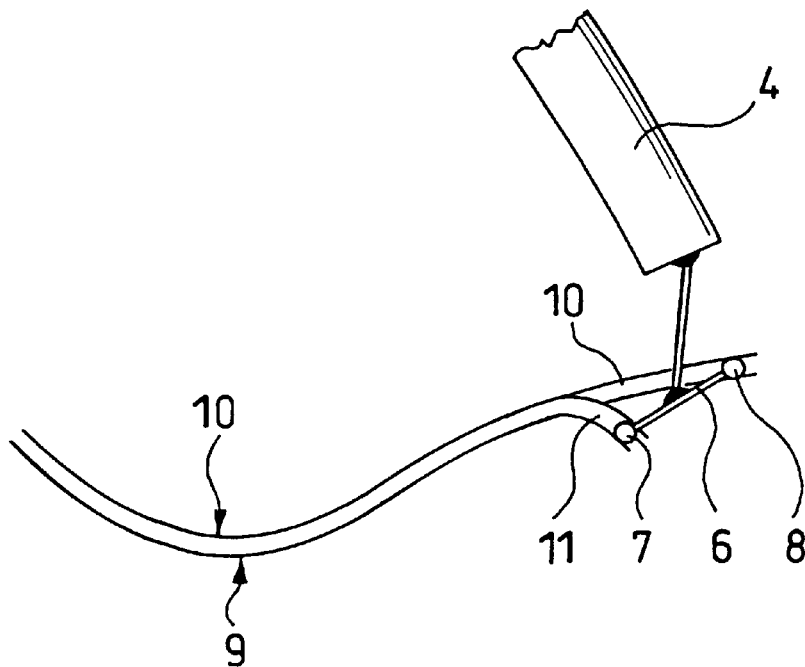
FIG. 11 is a schematic depiction of the bearing means with alternatively located guide rails.
Figure 12:
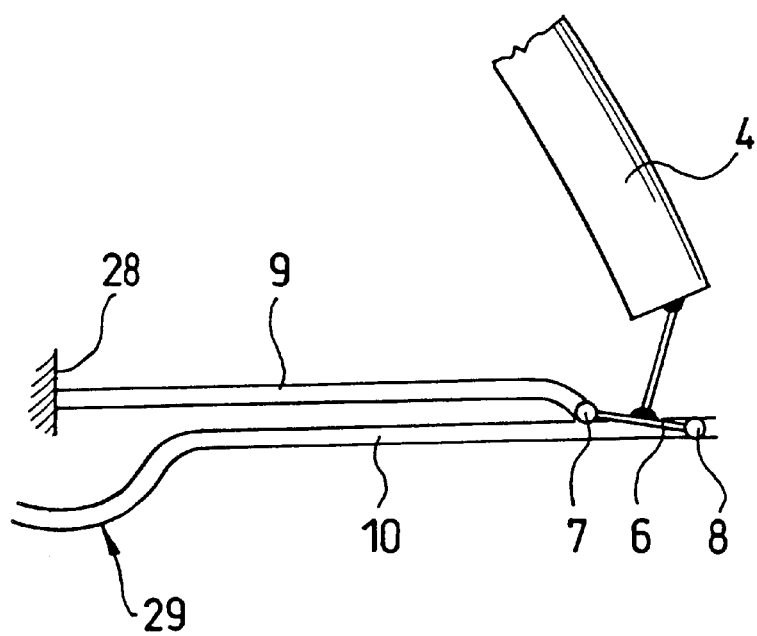
FIG. 12 is a schematic depiction of the bearing mechanism with another arrangement of the guide rails.

A certain dynamic behavior of the roof column rod 6 can be established by different arrangement of the guide rails 9, 10. For the arrangement shown in FIG. 11, the guide rails 9, 10 are located parallel next to one another adjacent to an initial section (ascending section 11) of the guide rail 9 and run on a arcuate curve. For the arrangement shown in FIG. 12, the guide rail 9 runs largely linearly against a stop 28, while the guide rail 10 runs out in an arcuate section 29. The rear sliding joint 8 is driven, for example, by means of a cable pull and moves the roof column rod 6 in a linear forward motion until the front sliding joint 7 adjoins the stop 28. Further displacement of the rear sliding joint 8 on the section 29 of the arc causes the pivoting of the roof rod 4 into its horizontal stowed position.

On the stop 28, there can be a holding or locking mechanism which keeps the sliding joint 7 temporarily locked thereon so that, for backward displacement of the sliding joint 8, it is ensured that the sliding joints 7, 8 and the roof column rod 6 on the guide rails 9, 10 again assume their original mutual alignment and positioning, and reversal of the arrangement is precluded. In addition to the arrangements and behaviors shown in FIGS. 10 & 12, the two guide rails 9, 10 can be attached to the body in modified and/or combined arrangements.

Figure 14:
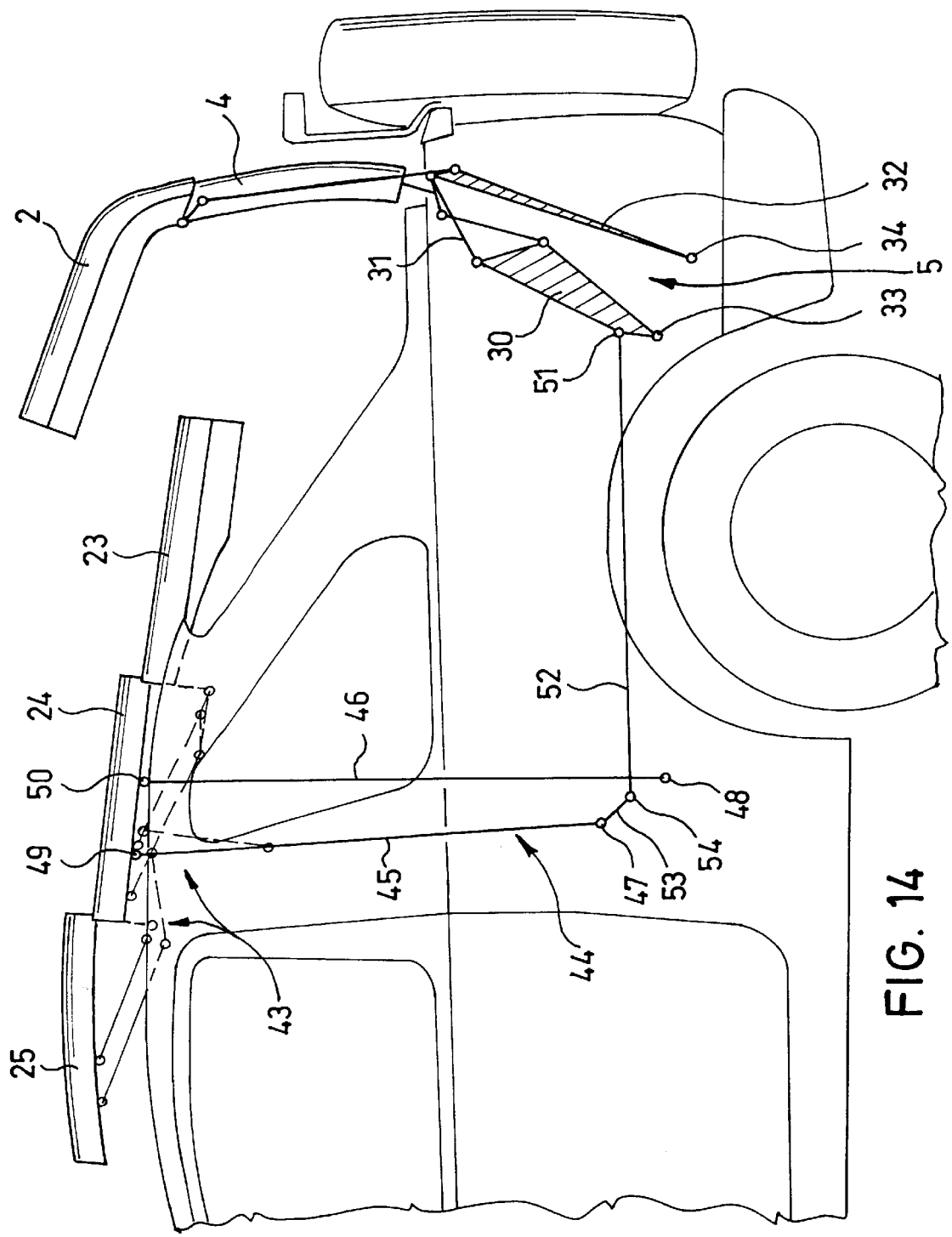
FIG. 14 is a schematic depiction of another embodiment of a convertible motor vehicle roof with a coupling between the bearing mechanism for the rear roof column and the bearing mechanism for the front movable roof element, in the partially opened position of the roof.
Figure 15:
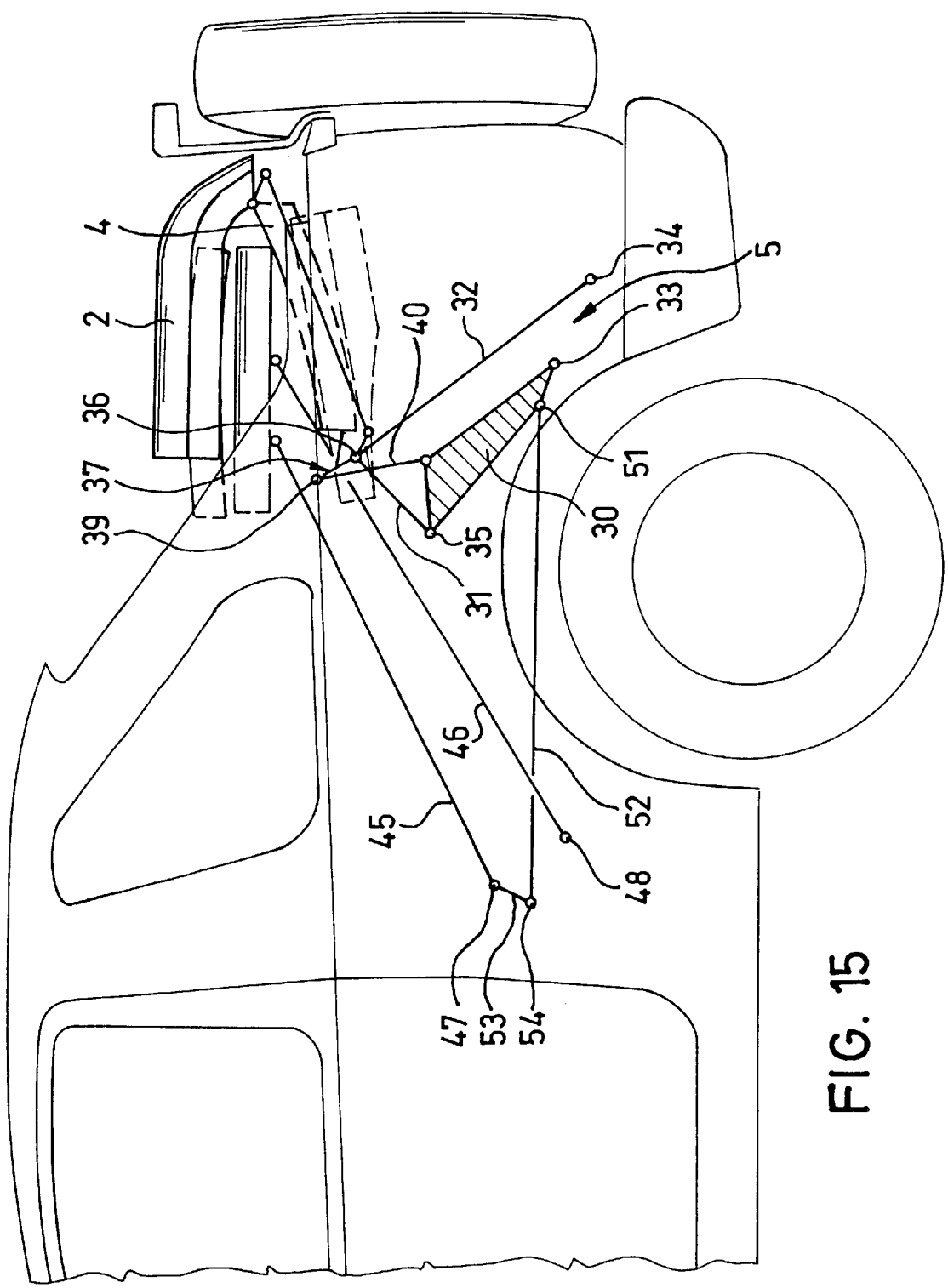
FIG. 15 is a side view of the roof shown in FIG. 14 with the motor vehicle roof in the opened position.

In a second embodiment of the convertible motor vehicle roof 1 (see FIGS. 13 to 15), the bearing means 5 for the roof column 4 contains a linkage with a first four-bar mechanism 26 and a second four-bar mechanism 27 which is combined therewith. The first four-bar mechanism 26 contains three rods 30, 31, and 32 with two body-mounted joints 33, 34 and with two joints 35, 36 on the ends of the middle rod 31. The second fourbar mechanism 27 likewise contains the rod 32 and the middle roof column rod 37 which, on the one hand, is coupled in the joint 38 to the rod 32, and on the other hand, is coupled via a joint 39 and another rod 40 in the joint 41 of the rod 30. The rods 30, 32 and 37 form ternary members while the remaining rods are binary members. The two combined four-bar mechanisms 26, 27 thus form a 7-bar arrangement with one degree of freedom.

The roof element 2 is driven by means of an auxiliary rod arrangement which is built comparably to the auxiliary rod arrangement described in the first embodiment, the rod 18 being coupled to the joint 42 of the rod 32.

A drive means can selectively drive the rod 30 or the rod 32 and alternatively also engage, for example, in the joint 33 or the joint 34.

To open the motor vehicle roof 1 from the closed position shown in FIG. 13, the first four-bar mechanism 26 is moved counterclockwise around the joints 33 and 34, the joint 36 being pivoted forward. Thus, the roof column rod 37 is also moved forward and it is pivoted by coupling via the rod 40 to the rod 30, clockwise around the joint 38. This yields a dynamic behavior of the roof column rod 37 which is comparable to the first embodiment and of the roof column 4 which executes a forward motion with a pivoting motion superimposed thereon. The roof element 2 is pivoted via the auxiliary rod arrangement in the corresponding manner.

In this embodiment, the roof column 4 can be pivoted by roughly 97° with respect to the initial position, and the dynamic behavior can be adjusted by fixing the length of the rods 37 and 40 and the position of the rods 38, 39 and 41. Even if the roof column rod 37 with the roof column 4 deposited (see FIG. 15) is located at the top dead center position relative to the rod 32, it is supported in this position by the rod 31 and can be moved back again by a drive motion of the first four-bar mechanism 26 (drive of the rod 30 or the rod 32) from the top dead center position.

The motor vehicle roof 1 contains a front roof section with three movable roof elements 23, 24 and 25 which are moved into the stowed position when the motor vehicle roof is converted and opened via the deposition stowage mechanism 43 (see especially FIGS. 5 to 9 and 14 and 15). The deposition mechanism 43 contains a four-bar mechanism 44 with a front rod 45 and a rear rod 46 which, on the one hand, are coupled to the body in the joints 47, 48 and to the middle roof element 24 in the joints 49, 50. Each of the front and the rear roof elements 25, 23 are connected to the middle roof element 24 via a four-bar mechanism so that when the roof elements are stowed, roughly parallel to each other with the front roof element 25 pivoted over the middle roof element 24 and the rear roof element 23 pivoted to under the middle roof element 24.

A coupling rod 52 is coupled, on the one hand, to the rod 30 in the joint 51, and on the other hand, to a short extension 53 of the front rod 45 of the four-bar mechanism 44 in the joint 54. The coupling rod 52 forms a mechanical coupling of the four-bar mechanism of the roof column 4 with the four-bar mechanism 44 of the deposition mechanism 43 of the front roof elements 23, 24, and 25 so that their synchronous coordinated movements are ensured when the motor vehicle roof 1 is being stowed and collisions of the roof elements 23, 24, 25 with the rear roof column 4 are prevented. The coupling rod 52 can also transfer a driving motion so that only one drive is necessary for stowing the front roof elements and the roof column 4. This drive can engage either the deposition mechanism 43 of the front roof elements 23, 24, 25 or the four-bar mechanism of the roof column 4.

Coupling can be effected in a comparable manner between the deposition mechanism 43 of the front roof elements 23, 24, 25 and the linkage described in the first embodiment with the sliding joints and with any other deposition mechanisms.

The rods shown schematically as straight lines in the figures can also be made curved or elbowed, if necessary, according to the space conditions when the roof is being stowed.

What is claimed is:

1. Convertible motor vehicle roof with a roof column which displaceable into a stowed position by a bearing mechanism for opening the motor vehicle roof; wherein the bearing means comprises a linkage arrangement constructed and arranged to produce an essentially forward motion of the roof column with respect to a motor vehicle body at a bottom end of the roof column and to deposit the column in a stowed position via an essentially rearward pivoting motion around said bottom end of the roof column, further including guide rails for guiding the bottom end of the roof column during the forward motion of the roof column.

2. Motor vehicle roof as claimed in claim 1, wherein a roof element is supported in a pivot joint on a top section of the roof column.

3. Motor vehicle roof as claimed in claim 2, wherein the roof element has its own pivoting drive.

4. Motor vehicle roof as claimed in claim 1, wherein the guide rails include two guide rails, the linkage arrangement comprising a roof column rod which is permanently connected to the roof column and which has two spaced sliding joints which are movably guided on the two guide rails which are spaced apart from one another and which are located roughly in a lengthwise direction of the motor vehicle so that the roof column rod is moved along the guide rails and produces the forward motion and the pivoting motion of the roof column.

5. Motor vehicle roof as claimed in claim 4, wherein said two spaced sliding joints comprise a front sliding joint and a rear sliding joint, each of which runs in a respective one of said two guide rails; wherein the guide rail for said rear sliding joint initially runs essentially linearly and the guide rail for the front sliding joint initially runs at an angle to the guide rail for the rear sliding joint such that the roof column rod executes an initial pivoting motion around the rear sliding joint.

6. Motor vehicle roof as claimed in claim 5, wherein the two guide rails extend roughly parallel after initial portions thereof and are curved up essentially in agreement in end sections thereof.

7. Motor vehicle roof as claimed in claim 5, wherein the two guide rails diverge as they continue from initial portions thereof.

8. Motor vehicle roof as claimed in claim 5, wherein the guide rail for the rear sliding joint has an end curvature with a radius of curvature which roughly corresponds to a mutual distance of between the two sliding joints and with a center of curvature which lies on an end stop for the front sliding joint.

9. Motor vehicle roof as claimed in claim 2, wherein the roof element is movable via a 4-bar linkage with motion derived from movement of the roof column.

10. Motor vehicle roof as claimed in claim 2, wherein the linkage mechanism guides the roof column during deposition such that at least one of the top section of the roof column and the pivot joint for the roof element is moved down roughly on a vertical line.

11. Motor vehicle roof as claimed in claim 1, wherein the roof column is one of a rear column and a D column of the motor vehicle.

12. Convertible motor vehicle roof with a roof column which displaceable into a stowed position by a bearing mechanism for opening the motor vehicle roof; wherein the bearing means comprises a linkage arrangement constructed and arranged to produce an essentially forward motion of the roof column with respect to a motor vehicle body at a bottom end of the roof column and to deposit the column in a stowed position via an essentially rearward pivoting motion around said bottom end of the roof column, wherein a roof element is supported in a pivot joint on a top section of the roof column.

13. Motor vehicle roof as claimed in claim 12, wherein said linkage arrangement comprises a first four-bar mechanism which produces said an essentially forward motion, and a second four-bar mechanism which is combined with the first four-bar mechanism and which produces said essentially rearward pivoting motion.

14. Motor vehicle roof as claimed in claim 13, wherein the second four-bar mechanism has a middle rod which is permanently connected to the roof column and which is pivoted when the first four-bar mechanism moves.

15. Motor vehicle roof as claimed in claim 2, wherein the second four-bar mechanism has a front rod which is coupled to a front rod of the first four-bar mechanism.

16. Motor vehicle roof as claimed in claim 12, wherein said linkage arrangement comprises a first four-bar mechanism which produces said an essentially forward motion, and a second four-bar mechanism which is combined with the first four-bar mechanism and which produces said essentially rearward pivoting motion; wherein the roof element is movable via two coupled rods and is driven from a rod of the second four-bar mechanism.

17. Motor vehicle roof as claimed in claim 12, wherein a forward section of the roof comprises at least one movably supported roof element which is movable into a stowed position by means of a deposition mechanism supported on the vehicle body, and wherein the deposition mechanism is coupled to the linkage arrangement of the roof column.

18. Motor vehicle roof as claimed in claim 17, wherein the deposition mechanism is coupled to the linkage arrangement of the roof column by a mechanical coupling.

19. Motor vehicle roof as claimed in claim 18, wherein said coupling comprises a coupling rod which connects the bearing mechanism and a linkage of the roof column to a four-bar mechanism of the deposition mechanism of the at least one movably supported front roof element.

20. Motor vehicle roof as claimed in claim 17, wherein said at least one movably supported roof element is a rigid panel member.

* * * * *